(12) United States Patent
Brardo et al.

(10) Patent No.: US 10,457,415 B2
(45) Date of Patent: Oct. 29, 2019

(54) METHOD AND SYSTEM FOR ASSISTING THE BRAKING OF AN AIRCRAFT

(71) Applicant: AIRBUS (S.A.S.), Toulouse (FR)

(72) Inventors: Olivier Brardo, Labarthe sur Leze (FR); Antoine Casta, Saint-Jean (FR); Benoît Couturier, Goyrans (FR)

(73) Assignee: Airbus (S.A.S.), Blagnac (FR)

( * ) Notice: Subject to any disclaimer, the term of this patent is extended or adjusted under 35 U.S.C. 154(b) by 25 days.

(21) Appl. No.: 15/339,865

(22) Filed: Oct. 31, 2016

(65) Prior Publication Data

US 2017/0129623 A1     May 11, 2017

(30) Foreign Application Priority Data

Nov. 5, 2015 (FR) .................................... 15 60596

(51) Int. Cl.
| | |
|---|---|
| *B64D 45/04* | (2006.01) |
| *G08G 5/00* | (2006.01) |
| *B60T 8/17* | (2006.01) |
| *B64C 25/42* | (2006.01) |

(Continued)

(52) U.S. Cl.
CPC ............ *B64D 45/04* (2013.01); *B60T 8/1703* (2013.01); *B64C 25/426* (2013.01); *G08G 5/0013* (2013.01); *G08G 5/0021* (2013.01); *G08G 5/0086* (2013.01); *G08G 5/025* (2013.01); *G08G 5/065* (2013.01)

(58) Field of Classification Search
CPC ..... B64D 45/04; B60T 8/1703; B64C 25/426; G08G 5/0013; G08G 5/0086
See application file for complete search history.

(56) References Cited

U.S. PATENT DOCUMENTS

| 7,916,042 B2 | 3/2011 | Constans |
| 8,193,948 B1 * | 6/2012 | Shapiro ................. G08G 5/065 |
| | | 340/945 |
| 8,706,326 B2 | 4/2014 | Muller et al. |

(Continued)

FOREIGN PATENT DOCUMENTS

| EP | 2514647 A2 | 10/2012 |
| FR | 2817979 A1 | 6/2002 |

(Continued)

OTHER PUBLICATIONS

French Search Report for Application No. 1560596 dated Mar. 17, 2016.

*Primary Examiner* — Aaron L Troost
(74) *Attorney, Agent, or Firm* — Jenkins, Wilson, Taylor & Hunt, P.A.

(57) ABSTRACT

A method for assisting the braking of an aircraft on a runway comprises the steps implemented automatically, including: before the landing of the aircraft on the runway, receiving the input, by a crew member of the aircraft, of a target braking distance by a man-machine interface associated with a processing unit, the target braking distance corresponding to a distance between a threshold of the runway and a selected exit of the runway; engaging an automatic optimized braking mode of the aircraft making it possible for the aircraft to attain the target speed when it reaches the selected runway exit; and—controlling a braking system of the aircraft, while the aircraft is running on the runway, according to this automatic optimized braking mode.

19 Claims, 4 Drawing Sheets

(51) Int. Cl.
 G08G 5/02 (2006.01)
 G08G 5/06 (2006.01)

(56) References Cited

U.S. PATENT DOCUMENTS

| | | |
|---|---|---|
| 9,102,404 B2 | 8/2015 | Essadouni et al. |
| 2008/0249675 A1* | 10/2008 | Goodman ............ B64C 25/426 |
| | | 701/16 |
| 2012/0072105 A1* | 3/2012 | Feyereisen ............ G01C 21/00 |
| | | 701/409 |
| 2012/0265372 A1* | 10/2012 | Hedrick ................ H04L 67/36 |
| | | 701/3 |
| 2014/0257601 A1* | 9/2014 | Horne ................... B64D 45/00 |
| | | 701/16 |

FOREIGN PATENT DOCUMENTS

| | | |
|---|---|---|
| FR | 2903801 A1 | 1/2008 |
| FR | 2985977 A1 | 7/2013 |
| NL | 1 017 714 C2 | 5/2002 |
| WO | WO 02/47977 A1 | 6/2002 |
| WO | WO 2008/121530 A2 | 10/2008 |

\* cited by examiner

METHOD AND SYSTEM FOR ASSISTING THE BRAKING OF AN AIRCRAFT

CROSS-REFERENCE TO RELATED APPLICATION

This application claims the benefit of and priority to French patent application number 15 60596 filed on Nov. 5, 2015, the entire disclosure of which is incorporated by reference herein.

TECHNICAL FIELD

The disclosure herein relates to the field of braking an aircraft on a runway during its landing.

During operation, aircraft, in particular transport aircraft, have to land on airport runways. After landing on a runway, an aircraft runs on this runway while braking in order to decelerate sufficiently to be able to leave the runway using a runway exit. Pilots usually carry out braking corresponding to a rapid deceleration, shortly after landing the aircraft on the runway, in order to be certain that the speed of the aircraft is sufficiently low to be able to use the desired runway exit. This generally results in a phase where the aircraft is running or moving at low speed along the runway before the aircraft uses the runway exit. This phase of running at low speed can sometimes correspond to a running distance of several hundred meters. Such a procedure, even though it may be acceptable from the point of view of operating the aircraft by its airline company, has the disadvantage of uselessly increasing the time of occupation of the runway by the aircraft (because of the phase of running at low speed) and consequently of reducing the number of aircraft able to use the runway during a specified time interval. On recent aircraft, such as the Airbus® A380®, an automatic optimized braking mode allows the pilot of the aircraft to select, before the landing, a desired exit of the runway and then, after the landing, to command an automatic braking of the aircraft in order to attain a target speed of the aircraft when the aircraft reaches that runway exit. This automatic optimized braking mode is called BTV (Brake To Vacate). The target speed is chosen to be compatible with the selected runway exit: it can for example be 10 knots (approximately 18 km/h) for a runway exit substantially perpendicular to the runway or 30 knots (approximately 54 km/h) for a so-called high speed exit (High Speed Exit) corresponding to a smaller turn angle with respect to the runway. This BTV braking mode makes it possible to limit the time of occupation of the runway by the aircraft to strictly what is necessary. It also makes it possible to reduce the wear of the brakes of the aircraft during the braking. This BTV braking mode is notably described in the documents FR2.817.979 A1 and FR2.985.977 A1. The engagement of the BTV mode by a pilot of the aircraft is carried out by a man-machine interface in the cockpit before landing the aircraft. To do this, a representation of the runway, comprising the positions of the exits available on that runway, is displayed on a screen in the cockpit associated with an airport navigation computer of the OANS (Onboard Aircraft Navigation System) type, forming part of the avionic equipment of the aircraft (that is to say all of the computers in charge of flight management, flight controls, etc. of the aircraft, which correspond to a high safety level). A minimum braking distance of the aircraft is computed as a function of the current flight conditions of the aircraft and is displayed opposite the representation of the runway. Thus, the pilot can select a runway exit compatible with this minimum braking distance. The BTV braking mode is configured for adapting the braking such that the aircraft attains the target speed when it arrives at the runway exit selected by the pilot. The use of the BTV braking mode necessitates however the installation, in an avionic computer, of a database comprising the characteristics of a set of runways. This avionic computer can notably be an airport navigation computer of the OANS type, which manages the previously mentioned man-machine interface. As this OANS computer together with the database are installed in the avionic equipment, they must comply with a set of restraints relative to the certification of the aircraft, which involves high cost. It would be advantageous to be able to use the BTV braking mode at low cost.

SUMMARY

A purpose of the subject matter disclosed herein is to provide a solution to these problems. It relates to a method for assisting the braking of an aircraft on a runway. This method is noteworthy in that it comprises the following steps implemented automatically:

c) before the landing of the aircraft on the runway, receiving the input, by a crew member of the aircraft, of a target braking distance by a man-machine interface in the cockpit of the aircraft, this man-machine interface being associated with a processing unit included in avionic equipment of the aircraft, the target braking distance corresponding to a distance between a threshold of the runway and a selected exit of the runway;

d) engaging an automatic optimized braking mode (in particular a BTV braking mode) of the aircraft making it possible for the aircraft to attain a target speed when the aircraft reaches the selected runway exit;

f) controlling a braking system of the aircraft, while the aircraft is running on the runway, according to this automatic optimized braking mode in such a way that the aircraft attains the target speed when it reaches the selected runway exit.

Thus, given that a crew member enters the target braking distance directly by the man-machine interface associated with the processing unit, it is not necessary to have a database comprising characteristics of runways or an airport navigation computer in the avionic equipment of the aircraft. The result of this is therefore a reduction in the cost of using the automatic optimized braking mode on the aircraft.

Advantageously, the method comprises moreover the following steps before step c):

a) computing, by a first computer installed in the aircraft, at least one minimum braking distance of the aircraft on the runway, for which the aircraft attains the target speed;

b) displaying a representation of this at least one minimum braking distance on a screen in a cockpit of the aircraft, in such a way as to make it possible for a crew member of the aircraft to select the exit of the runway in such a way that this runway exit is compatible with this at least one minimum braking distance.

In a first embodiment, in step a), the minimum braking distance of the aircraft is computed by an avionic computer of the aircraft and, in step b), the representation of the minimum braking distance is displayed on a screen associated with that avionic computer. As a function of the minimum braking distance, the crew member can select a runway exit compatible with this minimum braking distance. In order to do this, he or she can use a map, for example a paper map of an electronic map displayed on a tablet or on a computer of the EFB (Electronic Flight Bag) type, independent of the avionic equipment of the aircraft, to search for information on the runway, in particular the distances between a threshold of the runway and the different runway exits. Only the runway exits for which the distance with respect to the runway threshold is greater than or equal to the minimum braking distance are considered compatible with that minimum braking distance. After having selected a runway exit, the crew member can enter, in step c), a target braking distance corresponding to the distance between the threshold of the runway and the selected runway exit.

In a second embodiment, in step a), the minimum braking distance of the aircraft is computed by a computer of the EFB type and, in step b), the representation of the minimum braking distance is displayed on a screen of the computer of the EFB type. In order to do this, according to a first alternative, prior to step a), the method comprises a step consisting of or comprising receiving from the crew member, through a man-machine interface of the computer of the EFB type, information relative to the runway and information relative to current characteristics of the aircraft. These various items of information are then used by the computer of the EFB type for computing the minimum braking distance of the aircraft. In this first alternative, this computer of the EFB type (independent of the avionic equipment of the aircraft) receives the information necessary for the computation of the minimum braking distance of the aircraft without necessitating a data link between the avionic equipment of the aircraft and the computer of the EFB type. According to a second alternative, prior to step a), the method comprises a step consisting of or comprising automatically transmitting information relative to the runway and information relative to current characteristics of the aircraft from an avionic computer of the aircraft to the computer of the EFB type, through a data link between that avionic computer of the aircraft and the computer of the EFB type. This data link preferably corresponds to a unidirectional data link, from the avionic computer to the computer of the EFB type, in order not to risk compromising the security of the computers of the avionic equipment.

Advantageously, step d) comprises the following sub-steps implemented by at least one avionic computer of the aircraft:
d1a) comparing the target braking distance received in step c), with a runway length corresponding to the runway; and
d2) if the target braking distance is less than or equal to the runway length, engaging the automatic optimized braking mode of the aircraft.

This makes it possible to carry out a consistency test of the target braking distance before using it for the optimized braking mode.

Also advantageously, step d) comprises the following sub-steps implemented by at least one avionic computer of the aircraft:
d1a) comparing the target braking distance received in step c) with a runway length corresponding to the runway;
d1b) comparing the target braking distance received in step c) with a minimum braking distance of the aircraft on the runway, for which the aircraft attains the target speed; and
d2) if the target braking distance is less than or equal to the runway length on the one hand and if the target braking distance is greater than or equal to the minimum braking distance, engaging the automatic optimized braking mode de the aircraft.

In a particular embodiment, the method comprises moreover a step e) implemented after step d) and before step f), this step e) comprising the following sub-steps:
e1) identifying, by a terrain surveillance system installed onboard the aircraft, the runway upon which the aircraft is going to land and searching, in a database associated with the terrain surveillance system, for a length corresponding to that runway;
e2) acquiring that length of the runway by the processing unit;
e3) comparing, by the processing unit, the target braking distance with the length of the runway acquired in step e2); and
e4) if the target braking distance is greater than the runway length, disengaging the automatic optimized braking mode of the aircraft.

This makes it possible to carry out a test of the consistency of the target braking distance with the length of the runway upon which the aircraft will actually land, in order to protect the aircraft from a runway exit, at the end of the runway, in the hypothesis where the runway upon which the aircraft will actually land does not correspond to the runway foreseen before engaging the automatic optimized braking mode or in the hypothesis of an error relating to a parameter relative to the runway (for example the length of the runway used in step d1a), etc.).

The disclosure herein also relates to a system for assisting the braking of an aircraft on a runway. This system is noteworthy in that it comprises a processing unit included in the avionic equipment of the aircraft, a man-machine interface in the cockpit of the aircraft being associated with this processing unit, this processing unit being configured for receiving the input by a crew member of the aircraft, by the man-machine interface, before landing the aircraft on the runway, of a target braking distance corresponding to a distance between a threshold of the runway and a selected exit of the runway,
the processing unit moreover being configured for:
engaging an automatic optimized braking mode of the aircraft making it possible for the aircraft to attain a target speed when the aircraft reaches the selected runway exit;
controlling a braking system of the aircraft, while the aircraft is running on the runway, according to this automatic optimized braking mode in such a way that the aircraft attains the target speed when it reaches the selected runway exit.

Advantageously, the system comprises moreover a first computer installed onboard the aircraft, configured for:
calculating at least one minimum braking distance of the aircraft on the runway, for which the aircraft attains the target speed; et
displaying a representation of this at least one minimum braking distance on a screen on a cockpit de the aircraft, in order to allow a member of the crew of the aircraft to select the runway exit, in such a way that this runway exit is compatible with this at least one minimum braking distance.

In a first embodiment, the first onboard computer is a computer forming part of the avionic equipment of the aircraft.

In a second embodiment, the first onboard computer is a computer of the EFB type and the screen upon which it displays the representation of the at least one minimum braking distance is a screen of the computer of the EFB type.

In a particular embodiment, the aircraft comprising a terrain surveillance system installed onboard the aircraft and a database associated with this terrain surveillance system, this terrain surveillance system being configured for identifying the runway upon which the aircraft is going to land and for searching in the database for a length corresponding to the runway, the processing unit is configured for implementing the following sub-steps after the engagement of the automatic optimized braking mode of the aircraft and before the aircraft is running on the runway:

acquiring that length of the runway;

comparing the target braking distance with that length of the runway; and if the target braking distance is greater than the length of the runway, disengaging the automatic optimized braking mode of the aircraft.

In an advantageous embodiment, the aircraft comprising a computer for managing communications with the ground, installed onboard the aircraft, and the processing unit being connected to the computer for managing communications with the ground, the processing unit is configured for:

receiving information coming from a ground station via the computer for managing communications with the ground, this information comprising at least a list of the different exits corresponding to the runway, as well as distances between these runway exits and the runway threshold;

sending at least the list of different runway exits to the man-machine interface in the cockpit of the aircraft associated with the processing unit;

during the entry, by the crew member, of the target braking distance:

commanding the display of the list of the different runway exits on a screen of the man-machine interface;

receiving a selection, by an interactive element of the man-machine interface, of one of the runway exits in the list of the different runway exits displayed on the screen of the man-machine interface; and storing, as the value of the target braking distance, the distance received from the ground station corresponding to the selected runway exit.

The disclosure herein also relates to an aircraft comprising a braking assistance system such as mentioned above.

BRIEF DESCRIPTION OF THE DRAWINGS

The disclosure herein will be better understood on reading the following description and on examining the appended figures.

DETAILED DESCRIPTION

Figure 1:
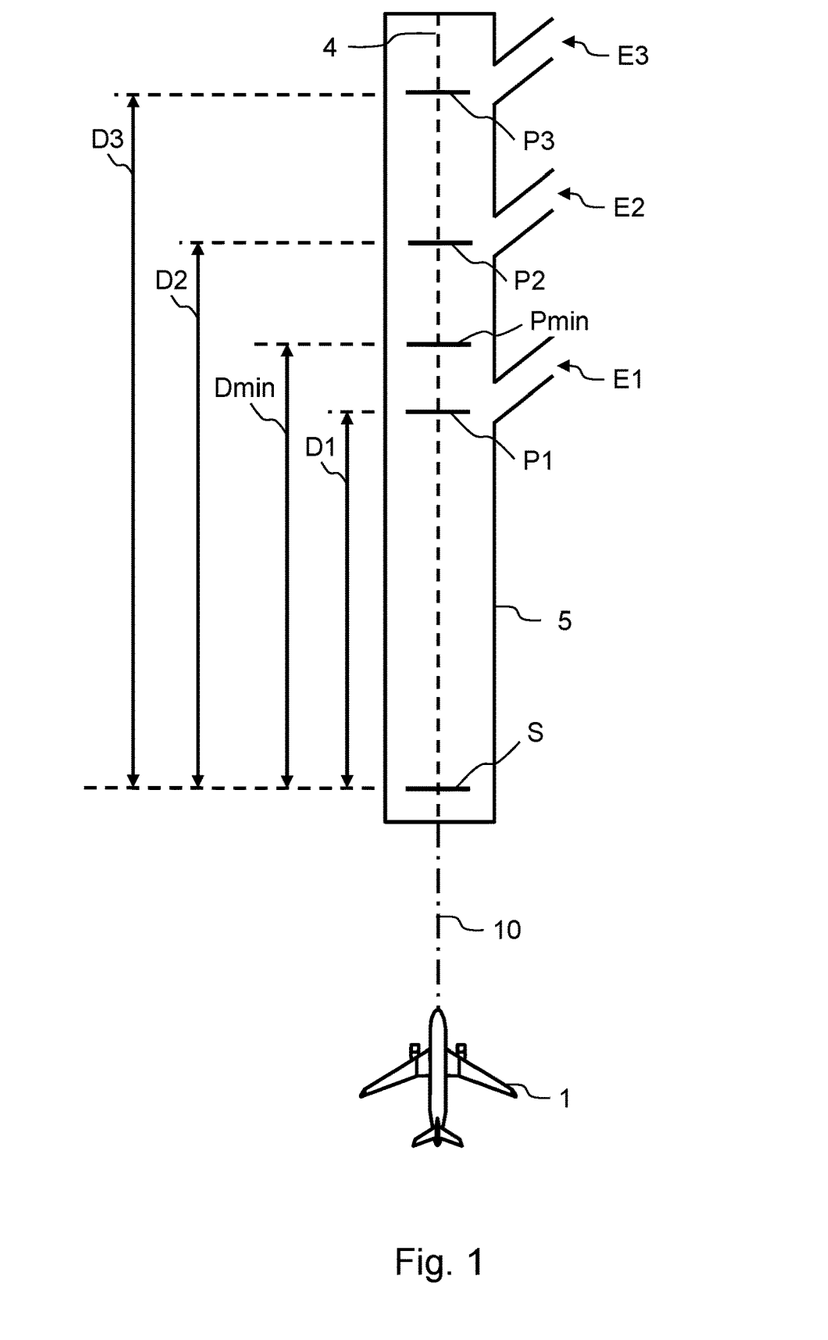
FIG. 1 shows a runway of an airport.

The aircraft 1 is shown in FIG. 1, in plan view, in a phase of approach to a runway 5 of an airport. The runway comprises a longitudinal axis 4. The aircraft 1 is following an approach axis 10 for the purpose of landing on the runway, close to a runway threshold S. In the example shown in the figure, the runway comprises three runway exits E1, E2 and E3 corresponding to respective positions P1, P2 and P3 along the longitudinal axis of the runway. These positions correspond respectively to distances D1, D2 and D3 with respect to the runway threshold S.

Figure 2:
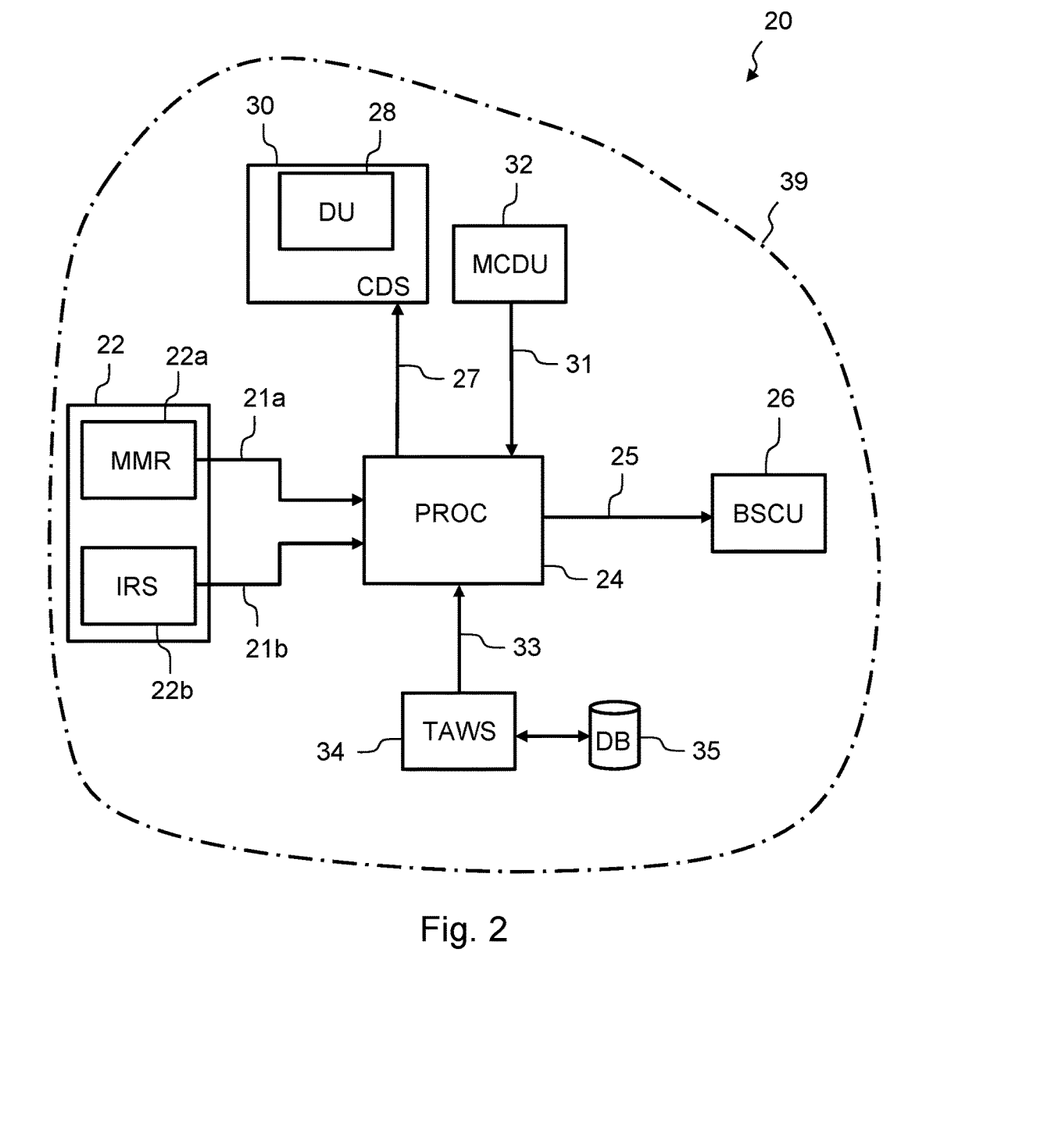
FIG. 2 shows a system for assisting the braking of an aircraft according to one embodiment of the disclosure herein.

The aircraft 1 comprises a braking assistance system 20, a first embodiment of which is shown in FIG. 2. The system 20 comprises a set of information sources 22, including a monitoring unit 22a, for example of the MMR (Multi Mode Receiver) type, and/or an inertial system 22b of the IRS (Inertial Reference System) type. The system 20 also comprises a processing unit 24 (referenced PROC in the figure, representing "PROCessor"), connected to the monitoring unit 22a by a link 21a, and/or to the inertial system 22b by a link 21b. Several embodiments are possible with regard to the processing unit 24: it can be integrated in a modular avionics computer of the IMA (Integrated Modular Avionics) type or it can correspond to a specific avionic computer, for example a flight management computer of the FMS (Flight Management System) type, a flight controls computer of the FCS (Flight Control System) type or a mixed flight management and flight controls computer of the FMGC (Flight Management and Guidance Computer) type. The braking assistance system 20 also comprises a system for braking the aircraft comprising an aircraft braking computer 26 of the BSCU (Braking and Steering Control Unit) type, connected to the processing unit 24 by a link 25, as well as a man-machine interface 32 for example of the MCDU (Multipurpose Control and Display Unit) type, connected to the processing unit 24 by a link 31. Without leaving the context of the disclosure herein, the man-machine interface 32 can also correspond to another type of man-machine interface, for example of the KCCU (Keyboard and Cursor Control Unit) type, etc. The braking assistance system 20 comprises moreover a display screen 28 (DU standing for "Display Unit") situated in a cockpit of the aircraft 1. This display screen is part of a display management system 30 in the cockpit, of the CDS (Control and Display System) type, at least one computer of which is connected to the processing unit 24 by a link 27. The various elements mentioned above, forming part of the braking assistance system 20, are included in the avionic equipment 39 of the aircraft.

When operating, a first computer installed onboard the aircraft computes at least one minimum braking distance of the aircraft on the runway, for which the aircraft attains a target speed. In this first embodiment, the first computer is an avionic computer of the aircraft, advantageously corresponding to the processing unit 24. This minimum braking distance is represented in FIG. 1 by the distance Dmin, corresponding to a position Pmin along the longitudinal axis of the runway. In order to compute the distance Dmin, the processing unit 24 uses information relative to current characteristics of the aircraft (for example: position, speed, etc.) that it receives from at least one of the information sources 22. The processing unit 24 also uses information relative to the runway (for example its position and its orientation) coming from a database installed onboard the aircraft (for example a database associated with a flight management computer of the FMS type). The document FR2.903.801 A1 describes a method of computing such a minimum braking distance.

After having computed this minimum braking distance, the processing unit 24 commands the display of the minimum braking distance on the screen 28 in the cockpit of the aircraft. According to a variant, the processing unit 24 commands the display of the minimum braking distance on a screen of the man-machine interface 32 of the MCDU type. Such a display makes it possible for a member of the crew, in particular a pilot of the aircraft, to become aware of the minimum braking distance on the runway. In accordance with the regulations in force, the crew member must have the availability of a map showing the runway upon which he wishes to land the aircraft. For the implementation of the disclosure herein, that map must comprise, moreover, information on the runway, in particular the positions of the runway exits as well as their respective distances with respect to the runway threshold. This map can be available in the cockpit of the aircraft in paper form and/or in electronic form, for example on a computer of the EFB (Electronic Flight Bag) type. The crew member, who knows the minimum braking distance displayed on the screen in the cockpit, can thus select a runway exit compatible with this minimum braking distance. A runway exit compatible with the minimum braking distance is understood to mean a runway exit where its distance with respect to the runway threshold is greater than or equal to the minimum braking distance. Thus, in the example shown in FIG. 1, the crew member can select one of the runway exits E2 or E3 for which the distances D2 or D3 with respect to the runway threshold are greater than the distance Dmin. On the contrary, he must not select the runway exit E1 for which the distance with respect to the runway threshold D1 is less than the distance Dmin. The choice by the crew member from among the compatible runway exits (E2 or E3 in the example mentioned above) depends upon operational considerations, such as for example the distances between these runway exits and a parking position provided for the aircraft, a route habitually used by the crew member or the airline company for going to the parking position, etc.

The processing unit 24 is configured for receiving the input, by the crew member of the aircraft, via the man-machine interface 32 of the MCDU type, before landing the aircraft on the runway, of a target braking distance corresponding to the distance between the threshold of the runway and the selected runway exit. The input of the target braking distance by the crew member can notably be carried out by entering a numerical value of the distance by a physical keyboard or of a virtual keyboard of the man-machine interface. In the aforethe example, the crew member can enter the distance D2 or D3 depending on whether he selects the runway exit E2 or E3.

Once the target braking distance has been entered by the crew member by the man-machine interface, the processing unit 24 engages an automatic optimized braking of the aircraft mode allowing the aircraft to attain the target speed when the aircraft reaches the selected runway exit. The automatic optimized braking of the aircraft mode is understood to be an automatic braking mode in which a crew member, in particular a pilot, can select a desired exit of the runway before the landing, the system then controlling an automatic braking of the aircraft in such a way as to attain a target speed of the aircraft when the aircraft reaches that runway exit. Such an automatic optimized braking mode can notably correspond to a braking mode of the BTV type as mentioned above.

After the aircraft has landed on the runway, while the aircraft is running on the runway, the processing unit 24 controls a braking system of the aircraft according to this optimized braking mode in such a way that the aircraft attains the target speed when it reaches the selected runway exit. In order to do this, the processing unit 24 sends appropriate instructions to the braking computer 26 of the BSCU type.

The braking assistance system 20 thus makes it possible to engage and then to use the automatic optimized braking mode, in particular the BTV mode, on an aircraft having neither an airport navigation system nor a database comprising characteristics relative to the runway exits of the runways upon which the aircraft is likely to land.

Figure 3:
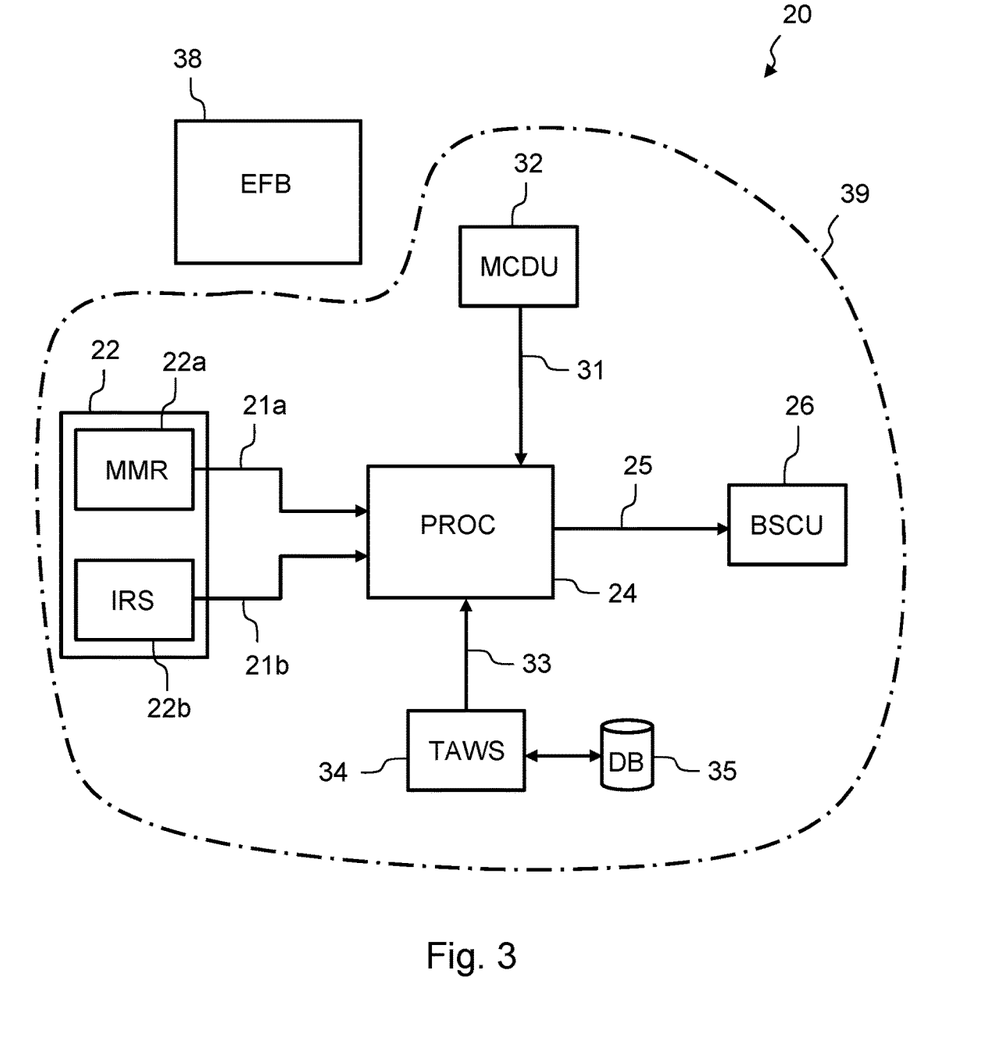
FIGS. 3 and 4 show other embodiments of a system for assisting the braking of an aircraft.

In a second embodiment shown in FIG. 3, the first computer corresponds to a computer 38 of the EFB type. This computer of the EFB type is independent of the avionic equipment 39 and has no connection with the latter. As in the first embodiment, this first computer uses information relative to the current characteristics of the aircraft and information relative to the runway in order to compute the minimum braking distance of the aircraft on the runway. Given that this first computer does not have any connection with the avionic equipment, it comprises a man-machine interface configured for allowing the input, by a crew member, of the aforethe items of information. This first computer, of the EFB type, can thus receive the information relatives to the runway and the information relative to current characteristics of the aircraft, necessary for computing the minimum braking distance of the aircraft on the runway. The crew member, for example a pilot, responsible for entering these items of information using the man-machine interface of the first computer can notably access these items of information, previously, on a display screen of the CDS display system of the cockpit of the aircraft, or on a screen of the man-machine interface 32 of the MCDU type. The computer 38 of the EFB type comprises a display screen on which it displays the minimum braking distance of the aircraft after having computed it. The crew member can then use that minimum braking distance of the aircraft for selecting a runway exit of the runway and then entering a target braking distance (corresponding to the selected runway exit) by the man-machine interface 32 of the MCDU type, as in the first embodiment. The engagement and the control of the automatic optimized braking mode are similar to those of the first embodiment.

Figure 4:
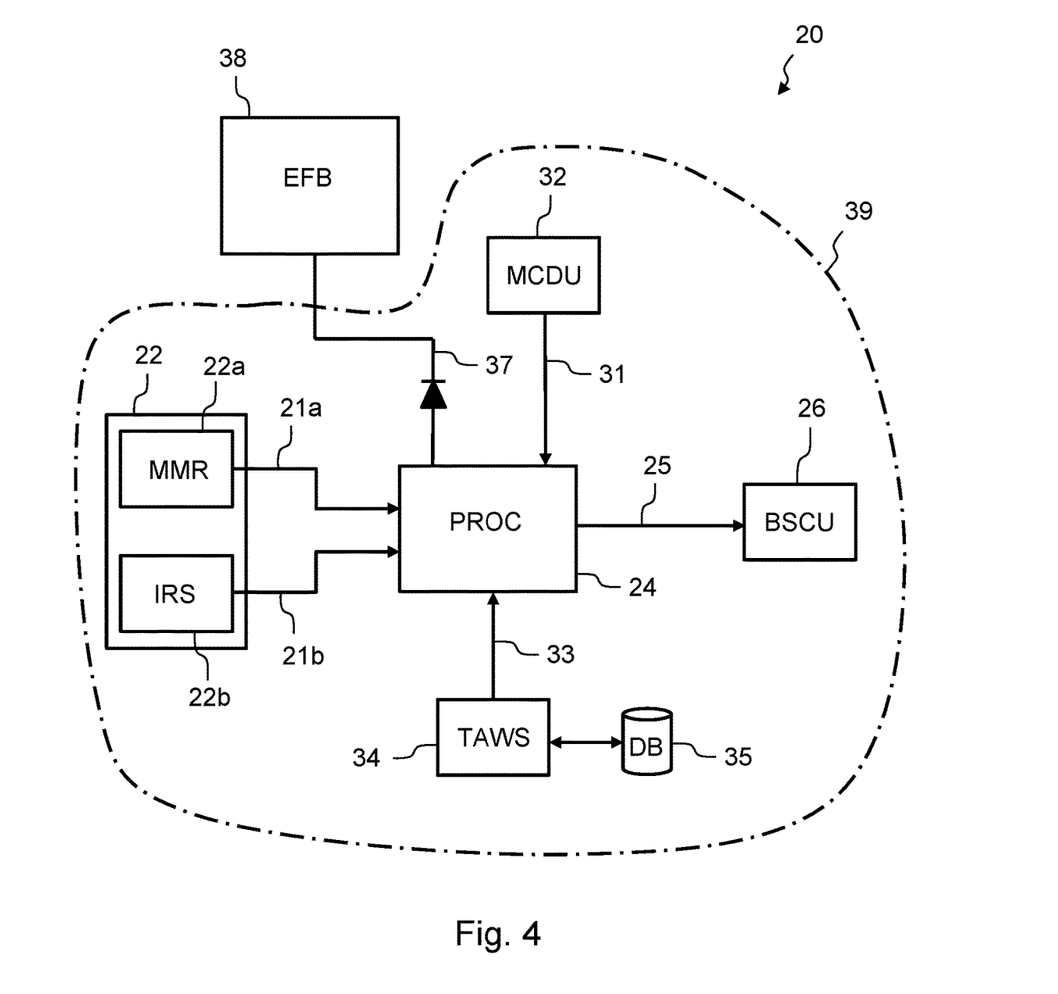

In a variant of the second embodiment shown in FIG. 4, the computer 38 of the EFB type is still outside of the avionic equipment 39, but a unidirectional link 37 (symbolized in the figure by a diode) is provided from the processing unit 24 to the computer 38 of the EFB type. This unidirectional link 37 allows the sending, by the processing unit 24 to the computer 38 of the EFB type, of the information relative to the runway and the information relative to the current characteristics of the aircraft, necessary for computing the minimum braking distance of the aircraft on the runway. This avoids the user initially having to read these items of information on a screen and secondly having to enter these items of information using the man-machine interface of the computer 38 of the EFB type.

In the second embodiment, as well as in the variant shown in FIG. 4, the map used by the crew member for selecting a runway exit is preferably displayed in electronic form on the computer 38 of the EFB type. In this case, the display of the minimum braking distance on the screen of the computer 38 of the EFB type can correspond to a numerical representation of the distance (for example a value in meters) and/or to a representation by a symbol placed on the map in a position corresponding to that distance with respect to the runway threshold. This makes it possible to improve the ergonomics for the crew member who can then easily see the position of the symbol corresponding to the minimum braking distance and compare this position with respect to the positions of the different exits of the runway. This facilitates his task of selecting a runway exit. Once a runway exit has been selected, the crew member can read on the map a distance with respect to the runway threshold corresponding to that runway exit and then enter that distance as a target braking distance by the man-machine interface 32 of the MCDU type. Such an operating mode makes it possible to do without an airport navigation computer and/or an onboard database comprising information on the positions of the exits of the different runways (which would have to meet the certification requirements, giving rise to high cost and constraints with regard to updates).

In an advantageous embodiment, after having received the target braking distance entered by the crew member by the man-machine interface 32 of the MCDU type, the processing unit 24 compares that target braking distance with a runway length corresponding to runway. This runway length can notably come from a database installed onboard the aircraft (for example a database associated with a flight management computer of the FMS type). The processing unit 24 then engages the automatic optimized braking mode of the aircraft only if the target braking distance is less than or equal to the runway length. Otherwise, it does not engage this automatic optimized braking mode and instead engages a non-optimized braking mode, for example a conventional automatic braking mode commonly called "Autobrake" adjusted to a medium (Medium) braking intensity. This comparison with the runway length is therefore a test of consistency of the target braking distance entered by the crew member. This consistency test makes it possible to avoid the aircraft exiting at the end of the runway. It is compatible with the aforethe first embodiment and with the aforethe second embodiment. In a variant, this consistency test comprises moreover a comparison of the target braking distance entered by the crew member with a minimum braking distance of the aircraft on the runway. The processing unit 24 then engages the automatic optimized braking mode of the aircraft only if, moreover, the target braking distance is greater than or equal to the minimum braking distance. This makes it possible to avoid a maximum braking of the aircraft which would be useless since the aircraft would not be able to comply with the target braking distance entered by the crew member, in the case where the latter would be less than the minimum braking distance.

In a particular embodiment, the braking assistance system 20 comprises moreover a terrain warning device 34 of the TAWS (Terrain Awareness and Warning System) type. This device is connected by a link 33 to the processing unit 24. It is also connected to a terrain database (DB) 35 comprising lengths of different runways. During the approach phase before the landing, in particular when the aircraft arrives at a height below about 400 to 500 feet (about 120 to 150 meters) above the height of the runway threshold, this device of the TAWS type is configured for identifying, in a conventional manner, the runway upon which the aircraft is going to land. It is configured moreover to search, in the database 35, for the length of the identified runway and for sending that length to the processing unit 24 which then carries out the acquisition of that length. If the automatic optimized braking mode was previously engaged, the processing unit 24 then compares the target braking distance with that length of the runway. If the target braking distance entered by the crew member is greater than the runway length, the processing unit 24 then disengages the automatic optimized braking mode of the aircraft. This makes it possible to avoid the use of the automatic optimized braking mode of the aircraft on a runway probably other than the one for which it was configured. In such a case, the processing unit 24 engages for example an automatic braking mode of the "Autobrake Medium" type.

In an advantageous embodiment, the processing unit 24 is connected to an onboard avionic computer (not shown in the figures) for managing communications between the aircraft and the ground, for example a computer of the ATSU (Air Traffic Services Unit) type. These communications between the aircraft and the ground can for example be of the ACARS (Aircraft Communication Addressing and Reporting System) type and use a communication device of the VHF type or of the SATCOM (SATellite COMmunications) type. The processing unit 24 is then configured for acquiring, from the computer for managing communications with the ground, information corresponding at least of a list of the different exits of the runway provided for the landing of the aircraft together with distances with respect to the runway threshold associated with these different runway exits, these items of information being sent from a ground station to the aircraft. Thus, for example, the runway provided for landing the aircraft can be chosen during a phase of preparation of the flight of the aircraft before its takeoff. This flight preparation phase, commonly called "dispatch" can at least partly be carried out in a ground station, in particular in premises of the airline company operating the aircraft. According to this advantageous embodiment, the ground station is equipped at least one computer connected to a database comprising information on different runways, this information at least corresponding, for each runway, to the list of the different runway exits corresponding to that runway, together with their distances with respect to the runway threshold. When an operator in the ground station chooses, by the computer in the ground station, a runway for landing the aircraft, the computer searches in the database for a set of information comprising the list of the different exits corresponding to that runway, together with their distances with respect to the runway threshold, and then it sends this set of information to the aircraft where this set of information is received by the communications management computer. Besides during a flight preparation phase, the choice of a runway by an operator in the ground station can also be carried out during the flight of the aircraft. Once received by the avionic computer for managing communications with the ground, the set of information is acquired by the processing unit 24. The latter uses this set of information for facilitating the entry of the target braking distance by the crew member by the man-machine interface 32 of the MCDU type. For this purpose, the processing unit 24 commands the display, on a screen of the man-machine interface, of the list of runway exits and possibly of the distances with respect to the runway threshold associated with these runway exits. It then suffices for the crew member to select one of the runway exits displayed on the screen, by an interactive element of the man-machine interface, without him having to type in the corresponding distance on the keyboard. The processing unit 24, knowing the runway exit selected by the crew member by the man-machine interface, then stores the distance with respect to the runway threshold (received from the ground station) associated with that runway exit as the value of the target braking distance.

The description of the disclosure herein is given with reference to at least one minimum braking distance. This minimum braking distance can correspond to a dry or wet runway state. In the case where the current runway state is known onboard the aircraft, this current runway state can be used for the computation of the minimum braking distance. It is also possible to provide the computation and display of two minimum braking distances, in particular of a first minimum braking distance corresponding to a dry runway state and a second minimum braking distance corresponding to a wet runway state. The crew member can also become aware of the runway exits that he can select as a function of the runway state. The dry and wet runway states are mentioned only by way of illustration and other runway states can be taken into consideration.

In the different embodiments described above, the target speed that the aircraft is supposed to attain when it reaches the selected runway exit can correspond to a predetermined speed value. According to a first alternative, this predetermined value can be identical for all of the runway exits, for example 10 knots (approximately 18 km/h). According to a second alternative, this predetermined value can be a function of the runway exit to which it corresponds: for example 10 knots (approximately 18 km/h) for a runway exit substantially perpendicular to the runway or about 30 knots (approximately 54 km/h) for a so called high speed runway exit (High Speed Exit) corresponding to a smaller turn angle with respect to the runway when the aircraft uses that runway exit. In this second alternative, the processing unit 24 must receive a value of the target speed. For this purpose, an entry of the value of the target speed by the crew member can be provided in addition to the entry of the target braking distance. This entry can be carried out in the form of entry of a numerical value by a keyboard, or in the form of a choice from a list of choices comprising for example the aforethe values 10 knots and 30 knots. In the particular case in which processing unit 24 receives from a ground station the list of runway exits corresponding to the runway as well as the distances of the runway exits with respect to the runway threshold, the processing unit 24 can moreover receive from the ground station target speed values corresponding to the different runway exits. The processing unit 24 then uses the target speed received from the ground station corresponding to the runway exit selected by the crew member.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting braking of an aircraft on a runway, the method comprising automatically implementing steps of:
   computing, using a first computer installed onboard the aircraft, a minimum braking distance of the aircraft on the runway, for which the aircraft attains a target speed;
   displaying a representation of the minimum braking distance on a screen of the first computer, such that a crew member of the aircraft can select one of one or more runway exits that is compatible with the minimum braking distance;
   receiving, via a second computer installed onboard the aircraft, information from a ground station, the information comprising at least a list of different runway exits;
   sending at least the list of different runway exits to a man-machine interface in the cockpit of the aircraft, the man-machine interface being associated with a processing unit included in avionic equipment of the aircraft;
   before landing the aircraft on the runway, entering, by the crew member of the aircraft, an input of a target braking distance by the man-machine interface in the cockpit of the aircraft, wherein the target braking distance corresponds to a distance between the runway threshold and the selected runway exit, and wherein the target braking distance is greater than or equal to the minimum braking distance;
   during entry, by the crew member, of the target braking distance:
      displaying the list of different runway exits on a screen of the man-machine interface; and
      receiving a selection, by an interactive element of the man-machine interface, of a runway exit in the list of different runway exits displayed on the screen of the man-machine interface;
   engaging an automatic optimized braking mode of the aircraft so the aircraft attains a target speed when the aircraft reaches the selected runway exit; and
   controlling a braking system of the aircraft after the landing of the aircraft on the runway, according to the automatic optimized braking mode, such that the aircraft attains the target speed when the aircraft arrives at the selected runway exit.

2. The method according to claim 1, comprising, prior to computing the minimum braking distance of the aircraft on the runway, receiving from the crew member, through a man-machine interface of the first computer, information relative to the runway and information relative to current characteristics of the aircraft.

3. The method according to claim 1, comprising, prior to computing the minimum braking distance of the aircraft on the runway, automatically transmitting information relative to the runway and information relative to current characteristics of the aircraft from an avionic computer of the aircraft to the first computer, through a data link between the avionic computer of the aircraft and the first computer.

4. The method according to claim 1, wherein engaging the automatic optimized braking mode of the aircraft comprises sub-steps implemented by at least one avionic computer of the aircraft:

comparing the target braking distance with a runway length corresponding to the runway; and engaging the automatic optimized braking mode of the aircraft when the target braking distance is less than or equal to the runway length.

5. The method according to claim 1, wherein engaging the automatic optimized braking mode of the aircraft comprises sub-steps implemented by at least one avionic computer of the aircraft:

comparing the target braking distance with a runway length corresponding to the runway;

comparing the target braking distance with the at least one minimum braking distance of the aircraft on the runway, for which the aircraft attains the target speed; and engaging the automatic optimized braking mode of the aircraft when the target braking distance is less than or equal to the runway length and the target braking distance is greater than or equal to the minimum braking distance.

6. The method according to claim 1, comprising, after engaging the automatic optimized braking mode of the aircraft and before controlling a braking system of the aircraft:

identifying, by a terrain surveillance system installed onboard the aircraft, the runway upon which the aircraft is to land and searching, in a database associated with the terrain surveillance system, for a length corresponding to the runway;

acquiring the length of the runway using the processing unit;

comparing, using the processing unit, the target braking distance with the length of the runway acquired; and disengaging the automatic optimized braking mode of the aircraft when the target braking distance is greater than the runway length.

7. The method according to claim 1, comprising selecting, as a function of the minimum braking distance, one of the one or more runway exits that is compatible with the minimum braking distance.

8. The method according to claim 7, wherein only runway exits for which a distance with respect to a runway threshold is greater than or equal to the minimum braking distance are compatible with the minimum braking distance.

9. The method according to claim 1, wherein the minimum braking distance is a first minimum braking distance corresponding to a dry runway state, the method comprising:

computing a second minimum braking distance of the aircraft on the runway, for which the aircraft attains a target speed, wherein the second minimum braking distance corresponds to a wet runway state; and displaying a representation of the second minimum braking distance on a screen of the first computer, such that a crew member of the aircraft can select one of one or more runway exits that is compatible with the minimum braking distance.

10. The method according to claim 9, comprising alerting at least one crew member of the aircraft of runway exits that are selectable as a function of the runway state.

11. The method according to claim 1, wherein the second computer manages communications with the ground station and is connected to the processing unit, and wherein the information comprises distances between the different runway exits and the runway threshold, the method comprising, using the processing unit:

during entry, by the crew member, of the target braking distance:

storing, as a value of the target braking distance, the distances received from the ground station corresponding to the selected runway exit.

12. A system for assisting braking of an aircraft on a runway, the system comprising:

a first computer installed onboard the aircraft, wherein the first computer is configured for computing a minimum braking distance of the aircraft on the runway, for which the aircraft attains a target speed, wherein the first computer comprises a screen configured for displaying a representation of the minimum braking distance, such that a crew member of the aircraft can select one of one or more runway exits compatible with the minimum braking distance;

a second computer configured for managing communications with a ground station and is installed onboard the aircraft; and a processing unit included in avionic equipment of the aircraft, wherein a man-machine interface in the cockpit of the aircraft is associated with the processing unit, wherein the processing unit is configured for:

receiving, via the second computer, information from the ground station, the information comprising at least a list of different runway exits;

sending at least the list of different runway exits to the man-machine interface in the cockpit of the aircraft associated with the processing unit;

entering, by the crew member of the aircraft, using the man-machine interface and before landing the aircraft on the runway, an input of a target braking distance corresponding to a distance between a threshold of the runway and the selected runway exit, wherein the target braking distance is greater than or equal to the minimum braking distance;

during entry, by the crew member, of the target braking distance:

displaying the list of different runway exits on a screen of the man-machine interface; and receiving a selection, by an interactive element of the man-machine interface, of a runway exit in the list of different runway exits displayed on the screen of the man-machine interface;

engaging an automatic optimized braking mode of the aircraft so the aircraft attains a target speed when the aircraft reaches the selected runway exit; and controlling a braking system of the aircraft after the landing of the aircraft on the runway, according to the automatic optimized braking mode, such that the aircraft attains the target speed when the aircraft arrives at the selected runway exit.

13. The system according to claim 12, wherein the aircraft comprises a terrain surveillance system installed onboard the aircraft and a database associated with the terrain surveillance system, wherein the terrain surveillance system is configured for identifying the runway upon which the aircraft is to land and for searching in the database for a length corresponding to the runway, wherein the processing unit is configured for implementing, after engagement of the automatic optimized braking mode of the aircraft and before the aircraft is on the runway, sub-steps as follows:

acquiring the length of the runway;

comparing the target braking distance with the length of the runway; and disengaging the automatic optimized braking mode of the aircraft when the target braking distance is greater than the length of the runway.

14. The system according to claim 12, wherein:

the processing unit is connected to the second computer:

the information comprises distances between the different runway exits and the runway threshold; and during entry, by the crew member, of the target braking distance:

storing, as a value of the target braking distance, the distances received from the ground station corresponding to the selected runway exit.

15. An aircraft comprising a braking assisting system according to claim 12.

16. The system according to claim 12, wherein only runway exits for which a distance with respect to a runway threshold is greater than or equal to the minimum braking distance are compatible with the minimum braking distance.

17. The system according to claim 16, wherein the first computer is configured to receive a selection of one of the one or more runway exits compatible with the minimum braking distance.

18. The system according to claim 12, wherein:

the minimum braking distance is a first minimum braking distance corresponding to a dry runway state;

the first computer is configured for computing a second minimum braking distance of the aircraft on the runway, for which the aircraft attains a target speed;

the second minimum braking distance corresponds to a wet runway state; and the first computer is configured for displaying a representation of the second minimum braking distance on a screen of the computer, such that a crew member of the aircraft can select one of one or more runway exits that is compatible with the minimum braking distance.

19. The system according to claim 18, wherein the first computer is configured for alerting at least one crew member of the aircraft of runway exits that are selectable as a function of the runway state.

* * * * *